| [72] | Inventor | Alvin T. Classen |
| | | Norfolk, Nebr. |
| [21] | Appl. No. | 838,837 |
| [22] | Filed | July 3, 1969 |
| [45] | Patented | June 29, 1971 |
| [73] | Assignee | Henningsen Foods, Inc. |
| | | White Plains, N.Y. |

[54] EGG-CRACKING HEAD AND SEPARATING MEANS
6 Claims, 9 Drawing Figs.

| [52] | U.S. Cl. | 146/2 |
| [51] | Int. Cl. | A47j 43/14 |
| [50] | Field of Search | 146/2 |

[56] References Cited
UNITED STATES PATENTS

| 2,966,184 | 12/1960 | Willsey | 146/2 |
| 3,058,501 | 10/1962 | Kirkland | 146/2 |
| 3,142,322 | 7/1964 | Shelton et al. | 146/2 |
| 3,190,328 | 6/1965 | Twedt et al. | 146/2 |

*Primary Examiner*—William S. Lawson
*Attorney*—Norman N. Holland

ABSTRACT: An improved separating means for use on automatic egg-breaking machines of the type which receive whole eggs and fed them to cracking heads and separating means. The cracking heads crack or open the eggs and drain the egg yolks and the egg whites into separating pans for draining the yolks and the whites into separate storage containers. The improved separating means of this invention includes an egg-cracking unit having egg-gripping jaws and attached egg-cracking knives. A related separating pan is mounted below the cracking unit. A yolk spoon in the pan receives the yolk and contains it while the white is drained through a draining hole in the separating pan into an egg-white container. The draining action of the white while the yolk spoon is held above the draining hole in the pan is used to cleanly tear or separate the white from the yolk.

INVENTOR.
ALVIN T. CLASSEN
BY
Norman N Holland
ATTORNEY

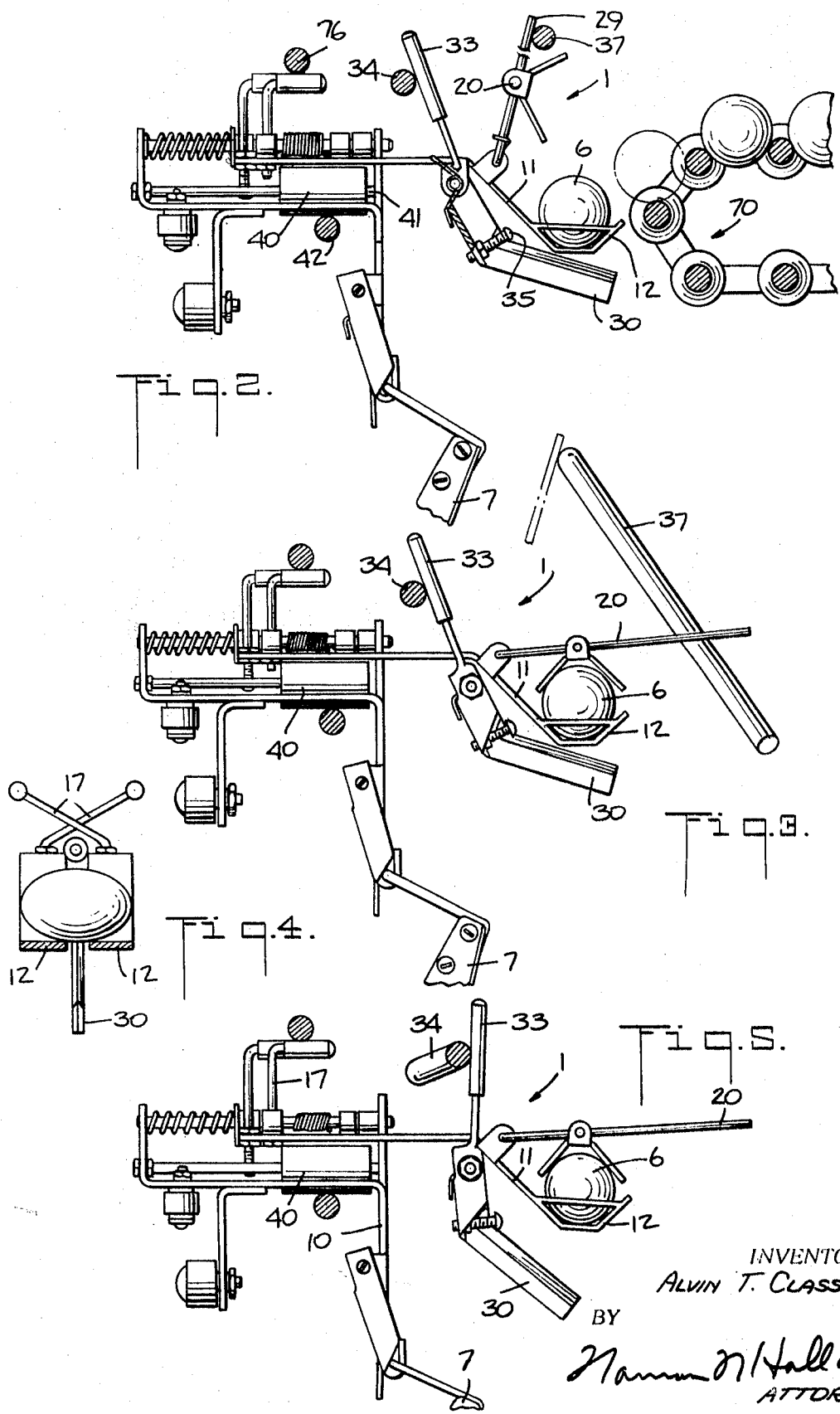

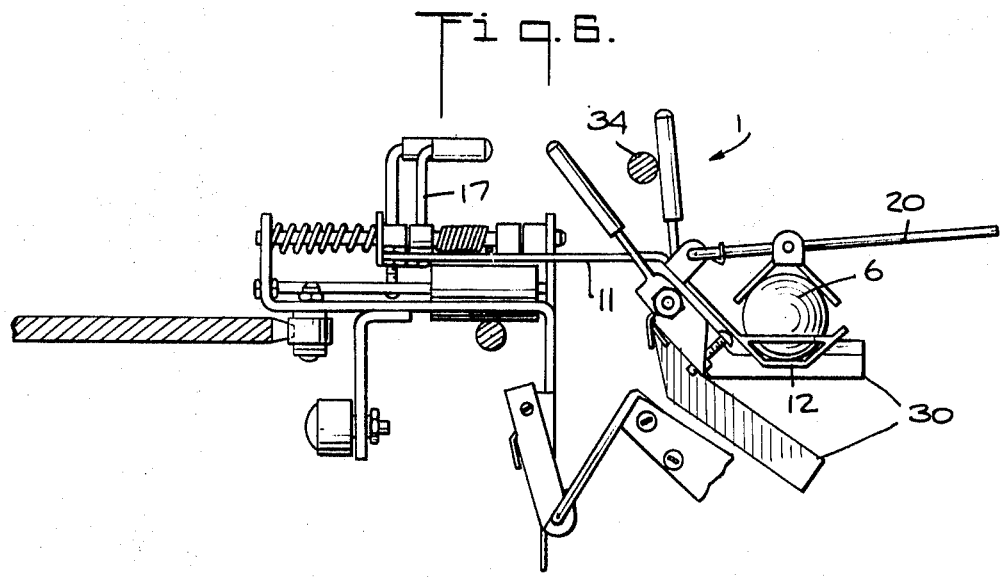
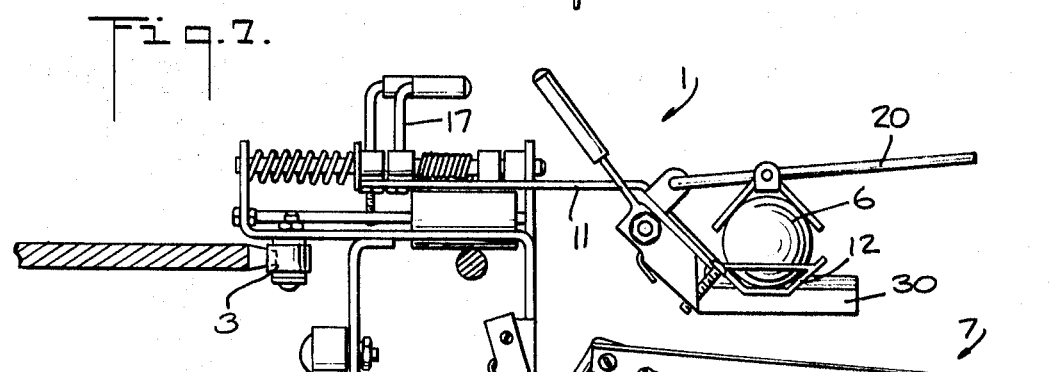
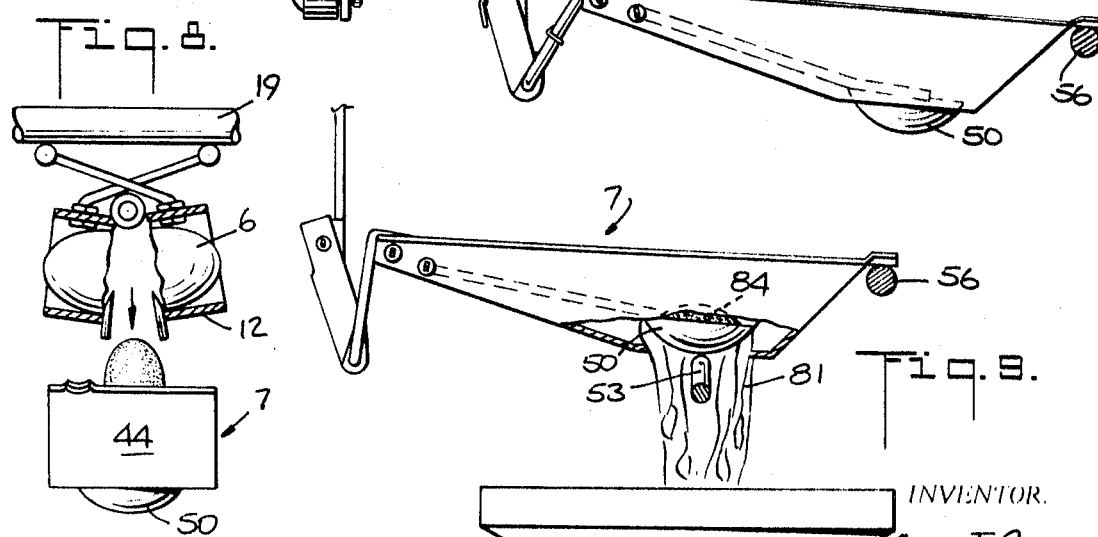

EGG-CRACKING HEAD AND SEPARATING MEANS

RELATED APPLICATION

The present invention relates to improved egg-cracking and separating means such as are used on automatic egg-breaking machines. The separating means of the present invention might be used, for example, in the egg-breaking and separating machine of the applicant's copending U.S. Pat. application Ser. No. 520,771 entitled Egg-Breaking Machine, and filed on Jan. 14, 1966 and now U.S. Pat. No. 3,455,356 dated July 15, 1969.

BACKGROUND OF THE INVENTION

A typical egg-breaking machine, such as the one disclosed in the above patent, includes a relatively large number of individual egg-separating heads which are carried successively past egg-loading, cracking, separating, dumping and pan-washing stations. The separating means of the present invention is of a type adapted for being mounted on a carrier means such as an endless chain and for performing the above operations at the various spaced stations. The egg-separating means of the present invention is an improvement upon the means disclosed in applicant's above-mentioned patent.

SUMMARY OF THE INVENTION

In particular, the separating head of this invention includes an improved means for separating the egg yolk and the egg white in the separating pan and for dumping the white and yolk separately with a better controlled separator of the whites and yolks. An improved method and means is provided to accomplish this purpose which is readily adapted for automatic operation and which is, in particular, adapted for use with the general apparatus of the above-noted patent with certain modifications in elements of that machine, including the separating heads as will be described below.

Accordingly, an object of the present invention is to provide an improved means for breaking and separating whole eggs.

Another object of the present invention is to provide an improved method and means for separating egg yolk from the egg white in an automatic breaking operation.

Another object of the present invention is to provide an improved means for a more complete separation of egg white and egg yoke in an automatic egg-breaking operation.

Another object of the present invention is to provide an improved means for a more complete separation of egg white and egg yolk in an automatic egg-breaking operation.

Another object of the present invention is to provide a more reliable and more efficient device for breaking and separating eggs on automatic egg-breaking machines.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

BRIEF DESCRIPTION OF THE DRAWING

FIGS. 2 through 9 are diagrammatic views illustrating the successive breaking and separating steps for the improved device of the invention.

DESCRIPTION OF THE PREFERRED EMBODIMENT

Figure 1:
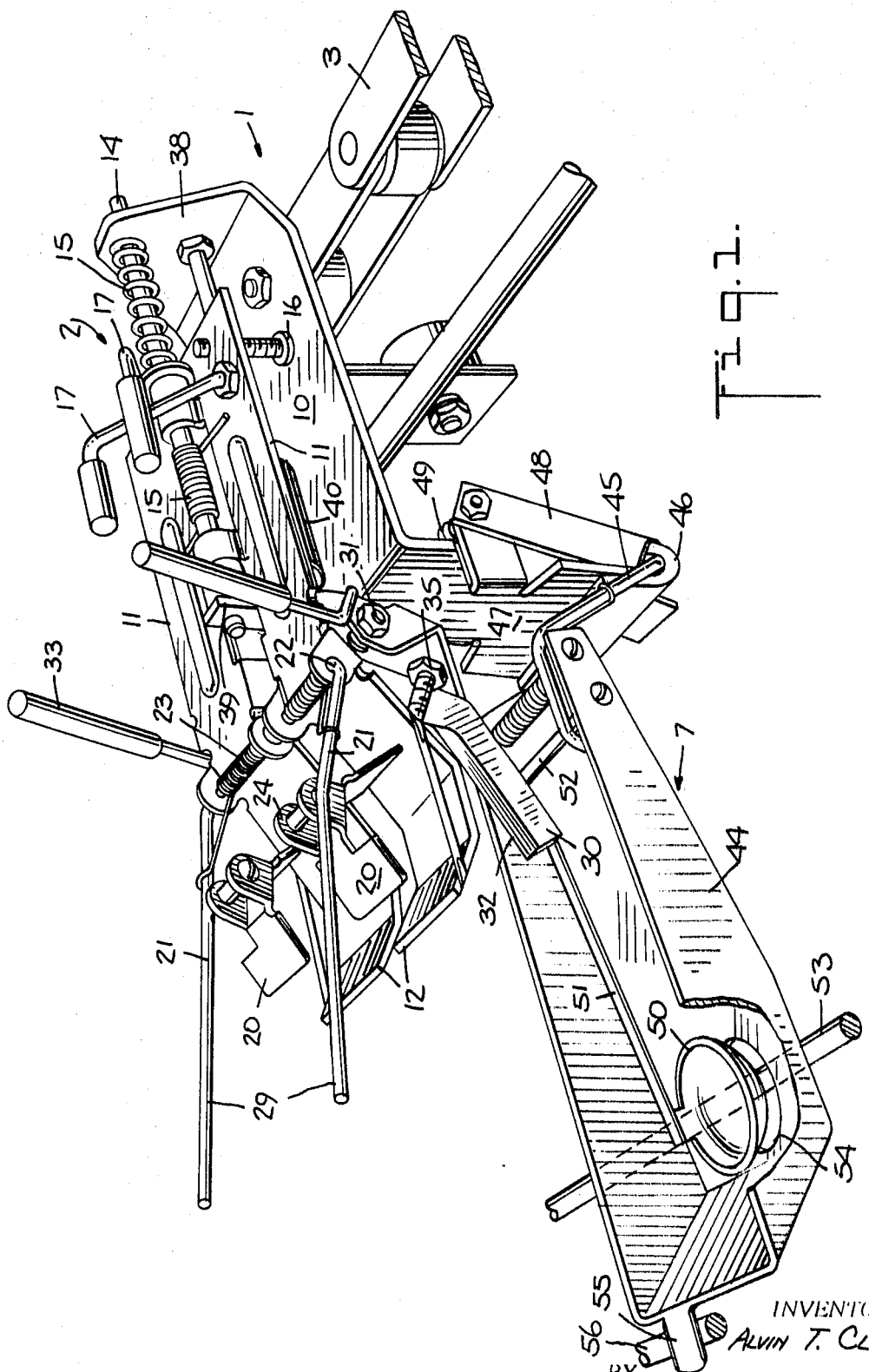
FIG. 1 is a perspective view illustrating an egg-breaking and separating device in accordance with the present invention in position on a typical breaking machine carrier means.

This invention is an improvement in the egg-breaking machine described in the above-mentioned patent and, more particularly, it incorporates improvements in the egg-separating head for such a machine and in certain related cam or operating elements which control the sequence of operations for the separating heads.

The improvements will be described with particular reference to a single separating means and with only such reference to the overall machine as is necessary to describe the improvements made over the machine of the patent.

In general, the egg-breaking machine mounts a number of separating heads on mounting chains which are positioned in a horizontal plane on a plurality of sprockets or pulleys so that the separating heads are moved around a closed horizontal path as they perform the series of breaking steps as illustrated in FIGS. 2 through 9 and as will be more fully described below.

Described very generally, the steps include a first step as illustrated in FIG. 2, where a whole egg 6 is loaded into each separating means 1. The egg 6 is then gripped by holddown lids 20 while the egg 6 is cracked by a pair of cutting knives 30 in the cutting steps shown sequentially in FIGS. 3 through 7. As shown in FIG. 8, the cracked egg 6 is now opened so that the egg white and the yolk flow into the separating pan 7 for the separating step illustrated in FIG. 9. These steps will now be described in greater detail in connection with a further description of the improved separating head, including the cracking head 2 and the separating pan 7 and related operation cams.

THE IMPROVED EGG-CRACKING HEAD AND SEPARATING MEANS

FIG. 1 is a perspective view illustrating a portion of an egg-breaking machine with a preferred embodiment of the improved egg-separating means 1 having a cracking head 2 attached to a mounting plate 10 carried by the endless chain 3 and positioned above the cooperating egg-separating cup 7 also removably attached to the mounting plate 10.

The egg-cracking head 2 comprises a pair of similar egg support arms 11 having end jaw portions 12. The inner adjacent edges of the two arms 11 are pivotally mounted on a common mounting pin 14 attached to the support plate 10 thus permitting the two jaw portions 12 to be swung away from one another in a subsequent egg-dumping operation as, for example, to the open position illustrated in FIG. 10. Coil springs 15 mounted on the pin 14 engage each of the arms 11 to resiliently retain the jaw portions in their closed position as illustrated with the surfaces of the two jaw portions 12 in common planes and with the normally closed position of the jaw portions 12 being adjusted by stop screws 16. A cam follower rod 17 is attached to each of the arms 11 and these rods 17 are positioned for sliding engagement with an elongated head opening cam or bar 19 at the egg-dumping position as illustrated in FIG. 8.

As illustrated in FIGS. 2 and 3 an egg holddown lid 20 is pivotally mounted on each jaw 12 on a mounting rod 21 having one end 22 pivotally connected to the arm 11. A coil spring 23 resiliently urges each of the holddown lids 20 into engagement with an egg supported on the jaw portions 12 of the arms 11. The holddown lids 20 have a U-shaped cross section generally complimentary to the U-shaped jaw portions 12 on the arms 11 to efficiently hold eggs of varying sizes. Each of the jaw holddown lids 20 is preferably pivotally mounted on its mounting rod 21 at 24 to facilitate the contact between the lid 20 and the egg surface. It is seen that the straight and angularly related sides of these members normally assure four points or lines of contact with eggs 6 within the normal range of egg diameters, i.e. eggs between 1⅛ and 1⅞ inches. This four-point contact is facilitated by the use of the double-hinged mounting for the holddown lid 20 as described above and by the shaping and proportioning of both the jaw portion 12 and the holddown lid 20 including their angularly related and generally straight individual sections.

The mounting rods 21 for each of the holddown lids 20 extend outwardly beyond the hinges 24 to form a cam follower rod portion 29 to permit the lids 20 to be lifted clear of the jaws 12 by cam rod 37 as illustrated, for example, in FIG. 2. A pair of egg-cutting knives 30 are pivotally mounted at 31, one on each of the arms 11. The knives 30 have cutting edges 32 proportioned for movement between an egg-cutting position as illustrated in FIGS. 7 and 8 and an open position spaced from the gripped egg 6 as illustrated in FIG. 2. The movement of each knife 30 is controlled by a cam rod 33 extending beyond the end of each knife 30 for engagement with a knife bar cam 34. Adjustable stops 35 on each knife 30 control the distance the knives 30 penetrate into the eggs 6 under the force of the knife-activating springs best illustrated at 36 in FIG. 1. The knives 30 are released by the knife control cam 34 to crack the egg 6 as the head 2 moves along on chain 3.

The above-described arms 11 with their associated knives 30 and holddown lids 20 are easily removed from the support plate 10 by sliding the mounting pin 14 inwardly of the machine against the force of one coil spring 14 thereby successively releasing the opposite ends of the pin 14 from the pivot pin mounting flanges 38 and 39 on the support plate 10.

The preferred embodiment of the cracking head includes an additional support means for the cracking head support plate 10 including a support wheel 40 rotatably mounted on an axle 41 and positioned to ride on an elongated support rod 42.

THE EGG-SEPARATING CUP

A separate egg-separating cup 7 is mounted beneath each egg-cracking head 2. These cups 7 receive the liquid egg white and egg yolk as they drain from the cracked eggs in the cracking heads 2 and thereafter separate the egg white and the egg yolk by draining them into separate pans. When desired, adjustments to the control cams are made to eliminate the separating operation so that the pans drain both the egg yolk and white simultaneously where a whole egg product is desired.

As best illustrated in FIG. 1, each egg cup 7 includes an egg white pan 44 pivotally attached to the same mounting plate 10 as the egg-cracking head 2 by means of a generally U-shaped hinge pin 45. The central portion of the hinge pin 45 is releasably held in a hook 46 formed on the lower leg 47 of the mounting plate 10 and positioned adjacent to latch 48 yieldably held in locking position above the hinge pin 45. The cups 7 are thus removed for replacement or cleaning by pressing the latch 48 clear of the hinge pin 45 against the force of a suitable latch pin spring 49 permitting the hinge pin 45 to be lifted out of the hook 46. The yolk-separating portion of the cup 7 comprises a yolk cup 50 attached to an elongated mounting rod 51 connected to the pan 44 by a hinge pin 52. The yolk cup 50 normally rests in and seals off an egg-white-draining aperture 54 in the bottom of the egg-white pan 44 except when it is lifted clear of the aperture 54 by an elongated lift cam 53 engaging the cup 50 during the egg-white-draining period.

The lift cam 53 has its lifting surface positioned along the path of movement of the yolk cup 50. When the egg white is to be drained, the lift surface of the cam 53 raises the yolk cup 50 thus opening the draining aperture 54. The cam 53 continues to hold the cup 50 in its raised position for a period permitting full drainage of the egg white and for an additional period during which the final downwardly flowing portion of the egg white is drawn by the forward movement of the entire separating means 2 on chain 3 to the point where the egg white is torn clear of the yolk near the edge of the yolk cup 50. This proportioning of the cam 53 and this tearing or pulling action has been found to provide a positive and important separation between white and yolk which provides for an almost complete separation of the two which eliminates contamination of white by yolk and vice versa.

The position of the separator cup 7 is controlled by cam follower 55 on the edge of the pan 44 which moves on and off an elongated cup guide bar 56 (FIGS. 1 and 9).

To facilitate the seating of the eggs 6 into the cracking head 2 during loading, the two jaws 12 are swung apart slightly to cradle the eggs. This slight jaw opening is provided by the engagement of the jaw follower rods 17 with the cradle bar 76 (FIG. 2).

THE EGG-BREAKING OPERATION

The operation of the egg-cracking heads 2 and separating cups 7 as they are moved around their closed paths during a typical egg-cracking operation will now be described.

The first step in the process is the loading step wherein several heads 2 are opened and supplied with an egg 6 from a roller-type egg conveyor 70 as illustrated in FIG. 2. As the heads 2 are moved into the loading position by the chain 3, the loading cam bar 37 lifts the egg holddown lids 20 away from the jaws 12 by engaging the cam follower rods 29 on the holddown lids 20 and swinging the lids 20 clear of the jaws 12.

During the egg loading, the cracking knives 30 are swung clear of jaws 12 by the knife bar 34.

After each cracking head 2 is a loaded with an egg 6, it is advanced by the chain 3 and the lid bar 37 closes the lids 20 as illustrated in FIG. 3. A slight additional advance of the egg-cracking head 2 results in the cracking knives 30 being swung further away from the egg 6 by the knife bar 34 as shown in FIG. 5, preparatory to the actual cracking operation which occurs as the cam rods 33 on the knives 30 successively pass off of the knife bar 34 and penetrate sharply into the egg 6 with the front knife 30 being released prior to the rear knife since it reaches the release point on bar 34 first resulting in a preferred sequential operation (FIGS. 6 and 7) of the two cracking knives 30.

The cracking head 2 now moves over a drip pan 80 while the separator cup 7 is lifted to a generally horizontal position by the engagement of its follower 55 with the cup guide bar 56 (FIG. 7). The cracking head 2 opening bar 19 now engages the two follower rods 17 on the cracking head arms 11 causing the arms 11 to swing away from one another to complete the cracking and opening of the egg 6 as illustrated in FIG. 8 and permitting the egg yolk and egg white 81 to drain into the separator cup 7 with the yolk flowing into the yolk cup 59 with the egg white flowing around the yolk onto the adjacent surface of the separator pan 44.

As each cracking head 2 moves beyond the head opening bar 19 with the separator cup still held horizontally by the cup guide bar 56, the head 2 passes the operator's position where the contents of the cup are observed by the operator and where the cup is dumped into a mixed egg pan in the event the yolk or white are mixed together. In order to dump the entire separating cup 7, the operator pushes the cup 7 back from the cup guide bar 56. The separator cup 7 now falls to a generally vertical position as illustrated in dash-dot lines dumping the egg yolk and white into a suitable receptacle. This dumped separator cup 7 remains in its dropped position until it is washed and again raised after the egg loading for the next cycle.

The moving cracking heads 2 now enter the white-separating zone. This separation results from a lifting of the yolk cup 50 by the engagement of the yolk cup 50 with lift cam 53 as illustrated in FIG. 9, causing the egg white to drain through the circular aperture 54 at the bottom of the separator pan 44 which has been opened by the lifting of the egg cup 50. This draining into the egg white collecting pan 8 continues as the cracking head 2 is moved along the relatively long separator lift cam 53 path to assure the complete drainage of the egg white 82 and to cause the above described tearing or pulling apart of the egg yolk and egg whites. The yolk 84 is next dumped into the yolk receptacle 9 by an inclined end portion on the cup guide bar 56 which tilts the entire separator cup 7 and which permits the yolk 84 to drain over the edge of the tilted cup.

It will be seen that improvements in egg-cracking or breaking machines are provided which give high-speed precise cracking operation and which at the same time provide for an improved control of the separation in which contamination of white with yolk and yolk with white have been substantially reduced.

As various changes may be made in the form, construction and arrangement of the parts herein and the method steps without departing from the spirit and scope of the invention and without sacrificing any of its advantages, it is to be understood that all matter herein is to be interpreted as illustrative and not in a limiting sense.

Having thus described my invention, I claim:

1. An improved egg-separating means for an egg-breaking machine comprising the combination of a support member having a portion adapted for connection to the links of an endless chain for movement therewith, an egg-cracking head having a pair of egg-gripping members pivotally connected together and to said support member, an egg-separating pan positioned beneath said egg-cracking head and being pivotally connected to said support member for movement between a generally horizontal egg-liquid-dumping position, a yolk-separating means comprising an aperture in the bottom of said separating pan, a yolk cup movably mounted on said pan and positioned to removably seal said aperture, said yolk cup being proportioned to accommodate one liquid egg yolk, an elongated lifting cam positioned for directly engaging said yolk cup and for lifting it clear of said pan aperture to permit the draining of egg white, and said cam length being proportioned whereby the egg white is pulled clear of the yolk prior to the lowering of said yolk cup to reseal said aperture.

2. The means as claimed in claim 1 in which said egg-gripping members comprise opposed egg-gripping portions, each of said gripping portions including a flat egg-engaging surface positioned whereby opposed flat portions engage opposite surfaces of an egg and are generally parallel to one another.

3. The means as claimed in claim 1 in which said egg-gripping members comprise opposed egg-gripping portions, each of said gripping portions including a flat egg-engaging surface positioned whereby opposed flat portions engage opposite surfaces of an egg and are generally parallel to one another, a knife pivotally mounted on each gripping member, and the pivotal connection for said knife on one member having a fixed position with respect to one flat surface on that member, and the pivotal connection for said other knife on said other member having a fixed position with respect to the flat surface on said member corresponding to said one flat surface.

4. The means as claimed in claim 1 in which said egg-cracking head and said separator pan are removably mounted on the chain.

5. An improved egg-separating means for an egg-breaking machine comprising the combination of a support member having a portion adapted for connection to the links of an endless chain for movement therewith, an egg-cracking head having egg-gripping members pivotally connected to said support member, an egg-separating pan positioned beneath said egg-cracking head and being pivotally connected to said support member for movement between a generally horizontal egg-liquid-receiving position and an inclined liquid-dumping position, a yolk-separating means comprising an aperture in the bottom of said separating pan, a yolk cup movably mounted on said pan and positioned to removably seal said aperture, an elongated cup lifting cam positioned for directly engaging said yolk cup and for lifting it clear of said pan aperture to permit the draining of egg white, and said cam length being proportioned whereby the egg white is pulled clear of the yolk prior to the lowering of said yolk cup to reseal said aperture.

6. The means as claimed in claim 5 in which said yolk cup has a rounded bottom, and said cam is positioned below the moving pan aperture for engaging said rounded cup bottom.